United States Patent

Mori et al.

[11] Patent Number: 5,270,398
[45] Date of Patent: Dec. 14, 1993

[54] CURABLE ACRYLIC RUBBER CONTAINING DIBUTYLAMINOTRIAZINE THIOL AND 9,10-DIHYDRO-9-OXA-10-PHOS-PHAPENATHRENE-10-OXIDE

[75] Inventors: Kunio Mori, Morioka; Kiyoshi Hosoya, Yokohama, both of Japan

[73] Assignee: Nippon Zeon Co., Ltd., Tokyo, Japan

[21] Appl. No.: 888,112

[22] Filed: May 26, 1992

[30] Foreign Application Priority Data

May 23, 1991 [JP] Japan .................. 3-147910

[51] Int. Cl.$^5$ .................. C08F 8/40; C08L 33/08
[52] U.S. Cl. .................. 525/327.3; 525/185; 525/328.6; 525/328.9; 525/329.5; 525/330.4; 525/340; 525/348
[58] Field of Search ............... 525/327.3, 328.6, 328.9, 525/329.2, 329.5, 330.4, 185

[56] References Cited

U.S. PATENT DOCUMENTS

| | | | |
|---|---|---|---|
| 3,366,598 | 1/1968 | Westlinning | 525/349 |
| 3,884,877 | 5/1975 | Kolb | 525/340 |
| 3,912,672 | 10/1975 | Morris | 525/340 |
| 4,826,925 | 5/1992 | Ozawa et al. | 525/331.8 |

FOREIGN PATENT DOCUMENTS 49-55750 5/1974 Japan .

Primary Examiner—Christopher Henderson
Attorney, Agent, or Firm—Armstrong, Westerman, Hattori, McLeland & Naughton

[57] ABSTRACT

A curable acrylic rubber composition which is comprised of (A) an acrylic polymer and, as a curing agent, a combination of (B) a polymer of a dibutylaminotriazine thiol with (C) 9,10-dihydro-9-oxa-10-phosphaphenanthrene-10 -oxide or a reaction product thereof with a carbonyl compound. This rubber composition is not scorched at room temperature, but is cured at a high rate of reaction at a rubber curing temperature.

7 Claims, 1 Drawing Sheet

CURABLE ACRYLIC RUBBER CONTAINING DIBUTYLAMINOTRIAZINE THIOL AND 9,10-DIHYDRO-9-OXA-10-PHOSPHAPENATHRENE-10-OXIDE

BACKGROUND OF THE INVENTION (1) Field of the Invention

This invention relates to an acrylic rubber composition having good scorch stability and curing characteristics.

More particularly, it relates to a curable acrylic rubber composition characterized in that the composition is not cured and thus not scorched at room temperature, but is cured at a high rate of reaction at a rubber curing temperature.

(2) Description of the Related Art

Various curable acrylic rubber compositions are known. One example of the curable acrylic rubber compositions includes a triazine thiol compound as a curing agent. Triazine thiol compounds enhance the rate of curing reaction, but have a problem such that the acrylic rubber composition is readily subject to scorching (i.e., premature curing). To solve this problem, attempts have been proposed wherein an onium salt, a guanidine compound or zinc dimethyldithiocarbamate is incorporated in the acrylic rubber composition (Japanese Unexamined Patent Publication No. S63-57628, S63-57629, S63-218752 and H2-4848).

SUMMARY OF THE INVENTION

A primary object of the present invention is to provide a curable acrylic rubber composition characterized in that it is not subject to scorching at room temperature, but is curable at an enhanced rate of curing reaction at a rubber curing temperature.

In accordance with the invention, there is provided a curable acrylic rubber composition comprising:

(A) an acrylic polymer which is a copolymer derived from (a) 60 to 99.9% by weight of an acrylic acid ester selected from the group consisting of alkyl acrylates having 1 to 8 carbon atoms in each alkyl group and alkoxyalkyl acrylates having 2 to 8 carbon atoms in each alkoxyalkyl group, (b) 0.1 to 10% by weight of an active group-containing unsaturated monomer, and (c) 0 to 30% by weight of a monoethylenically unsaturated monomer copolymerizable with the monomers (a) and (b);

(B) 0.05 to 5 parts by weight, per 100 parts by weight of the acrylic polymer, of a polymer of a dibutylaminotriazine thiol, which is represented by the following formula (1):

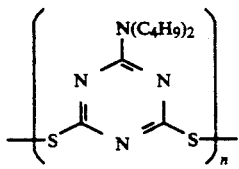

wherein n is an integer of 50 to 1,000, and (C) 0.6 to 3 moles, per mole of the dibutylaminotriazine thiol polymer (B), of 9,10-dihydro-9-oxa-10-phosphaphenanthrene-10-oxide represented by the following formula (2):

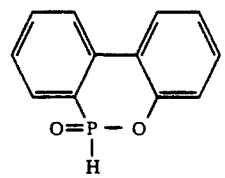

or a reaction product of 9,10-dihydro-9-oxa-10-phosphaphenanthrene-10-oxide with a carbonyl compound, represented by the following formula (3):

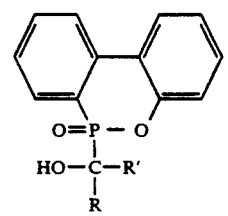

wherein R and R' independently represent a hydrogen atom or an organic atomic group.

DESCRIPTION OF THE PREFERRED EMBODIMENTS

Figure 1:
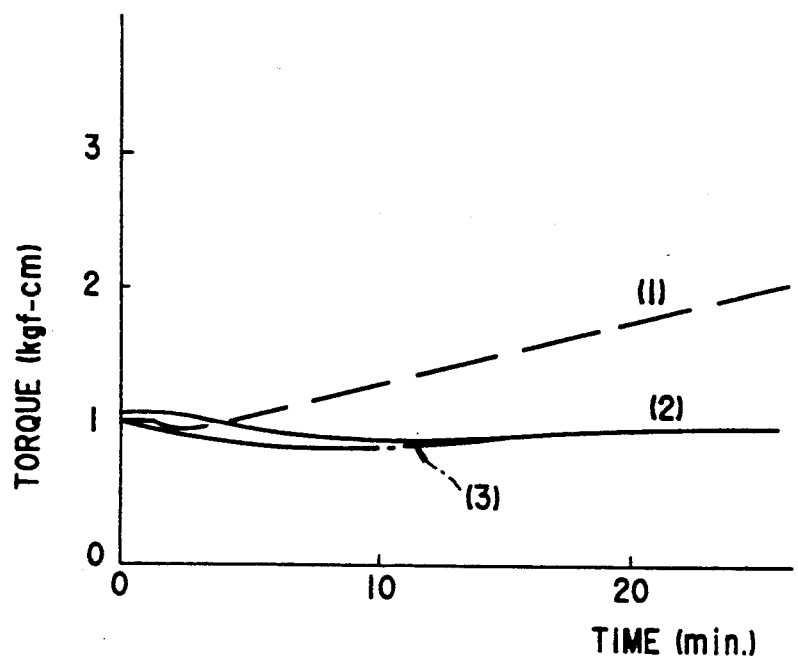
FIG. 1 is a graph of curves showing a relationship of viscosity of acrylic rubber compositions, expressed by a torque measured by an oscillating disc rheometer, with curing time as cured at a temperature of 110° C.

The acrylic polymer used in the invention is a copolymer derived from (a) 60 to 99.9% by weight of an acrylic acid ester selected from alkyl acrylates having 1 to 8 carbon atoms in each alkyl group and alkoxyalkyl acrylates having 2 to 8 carbon atoms in each alkoxyalkyl group, (b) 0.1 to 10% by weight of an active group-containing unsaturated monomer and (c) 0 to 30% by weight of a monoethylenically unsaturated monomer copolymerizable with the monomers (a) and (b).

As typical examples of the acrylic acid esters (a), there can be mentioned ethyl acrylate, butyl acrylate and methoxyethyl acrylate.

The active group-containing unsaturated monomer (b) has an active group having a function of an active site, such as an active chlorine group or an epoxy group. As the active chlorine group-containing unsaturated monomer, there can be mentioned, for example, 2-chloroethyl vinyl ether, vinyl chloroacetate, allyl chloroacetate, vinylbenzyl chloride, 2-chloroethyl vinyl ether, chloromethyl vinyl ketone and 5-chloromethyl-2-norbornene. As the epoxy group-containing unsaturated monomer, there can be mentioned, for example, glycidyl acrylate, glycidyl methacrylate, ally glycidyl ether and vinyl glycidyl ether.

The monoethylenically unsaturated monomer (c) copolymerizable with the above monomers (a) and (b) is used depending upon the properties required for the acrylic rubber composition. As the copolymerizable monoethylenically unsaturated monomer, there can be mentioned, for example, acrylonitrile, vinyl acetate, styrene, α-methylstyrene, acrylamide, vinyl chloride and vinylidene chloride.

As typical examples of the acrylic polymer, there can be mentioned an ethyl acrylate/vinyl chloroacetate copolymer, an ethyl acrylate/allyl glycidyl ether/acrylonitrile copolymer, an ethyl acrylate/butyl acrylate/glycidyl methacrylate copolymer and an ethyl acrylate/butyl acrylate/methoxyethyl acrylate/vinyl chloroacetate copolymer.

The curable acrylic rubber composition of the invention contains as a curing agent a combination of a dibutylaminotriazine thiol polymer of the formula (1) with 9,10-dihydro-9-oxa-10-phosphaphenanthrene-10-oxide of the formula (2) (this compound is hereinafter referred to as "HCA") or a combination of the dibutylaminotriazine thiol polymer of the formula (1) with the reaction product between HCA and a carbonyl compound, of the formula (3). The dibutylaminotriazine thiol polymer of the formula (1) can be prepared by subjecting a dibutylaminotriazine thiol to oxidative polymerization in an organic solvent by using sodium hypochlorite.

HCA of the formula (2) is readily reacted with a carbonyl compound to give a carbonyl addition product of the formula (3). As the carbonyl compound, there can be mentioned, for example, acetone, 2-pentanone, cyclopentanone, benzaldehyde and acetophenone.

R and R' in the formula (3) independently represent a hydrogen atom or an organic atomic group. Preferably, the organic atomic group is selected from alkyl groups having 1 to 8 carbon atoms, alkenyl groups having 2 to 8 carbon atoms, a phenyl group, aralkyl groups having 7 to 12 carbon atoms, and cycloalkyl groups having 3 to 10 carbon atoms.

The carbonyl addition products of the formula (3) generally have a melting point higher than that of HCA and are decomposed at a temperature higher than the melting thereof to produce HCA, although the melting point and the decomposition point vary depending on the particular carbonyl compound used. The curing reaction of the curable acrylic rubber composition of the invention is initiated when the combination of the dibutylaminotriazine thiol polymer with HCA is heated to a certain temperature or a higher temperature, and hence, the curing-initiating temperature of the combination of the dibutylaminotriazine thiol polymer with the carbonyl addition product of the formula (3) is higher than that of the combination of the dibutylaminotriazine thiol polymer with HCA of the formula (2). Therefore, a curable acrylic rubber composition with the combination of the dibutylaminotriazine thiol polymer with the carbonyl addition product of the formula (3) is scorched to a lesser extent than that in a curable acrylic rubber composition with the combination of the dibutylaminotriazine thiol polymer with HCA of the formula (2).

In view of the reaction efficiency, the amount of the dibutylaminotriazine thiol polymer of the formula (1) is 0.05 to 5 parts by weight, preferably 0.1 to 2 parts by weight, per 100 parts by weight of the acrylic polymer, and the amount of each of HCA of the formula (2) and the carbonyl addition product of the formula (3) is 0.6 to 3 moles, preferably 0.9 to 2 moles, per mole of the dibutylaminotriazine thiol polymer.

The curable acrylic rubber composition of the invention may have incorporated therein conventional additives such as a vulcanizer, a processing aid, a reinforcing agent, a filler, a softener, a plasticizer and an age stabilizer. The curable acrylic rubber composition can be prepared by kneading together the acrylic polymer, the dibutylaminotriazine thiol polymer of the formula (1), HCA of the formula (2) or the carbonyl addition product of the formula (3), and optional additives by a kneading means, for example, a roll or a Banbury mixer.

The curing of the acrylic rubber composition of the invention is carried out under conditions employed for the curing of conventional acrylic rubber compositions, i.e., at a temperature of 160° to 200° C. for 1 to 30 minutes.

The invention will now be specifically described by the following examples that by no means limit the scope of the invention. In the examples, % is by weight unless otherwise specified.

REFERENTIAL EXAMPLE 1

Oxidative Polymerization of 6-Dibutylamino-1,3,5-Triazine-2,4-Dithiol

In 700 ml of methanol, 100 g of 6-dibutylamino-1,3,5-triazine-2,4-dithiol (supplied by Sankyo Kasei K.K.) was dissolved, and 100 ml of an aqueous sodium hypochlorite solution containing 5% of active chlorine was added dropwise to the 6-dibutylamino-1,3,5-triazine-2,4-dithiol solution at room temperature over a period of 5 minutes with stirring. The thus-prepared precipitate was recovered by filtration and washed several times with methanol and water to give a polymer. The yield was 24.05%.

REFERENTIAL EXAMPLE 2

Synthesis of Acetone Addition Product of HCA

A flask provided with a cooling condenser was charged with 25 g of HCA (supplied by Sanko Kagaku K.K.), and 50 ml of acetone, which had been dried over sodium sulfate for 2 hours, was added whereby HCA was dissolved therein. The thus-prepared solution was heated at 57° C. under reflux for 2 hours to effect reaction. After the completion of reaction, unreacted acetone was removed by fractional distillation to yield a white solid. The solid was washed with hexane to give an acetone addition product of HCA. The yield was 77.25%.

EXAMPLE 1

Preparation and Evaluation of Curable Acrylic Rubber Composition

The 6-dibutylamino-1,3,5-triazine-2,4-dithiol polymer prepared in Referential Example 1, the acetone addition product of HCA prepared in Referential Example 2, and HCA were mixed together according to the formulations shown in Table 1 and kneaded at 40° C. for 10 minutes by using rolls to prepare curable acrylic rubber compositions. The amounts of HCA and the acetone addition product of HCA were 2 moles per mole of the 6-dibutylamino-1,3,5-triazine-2,4-dithiol polymer.

Figure 2:
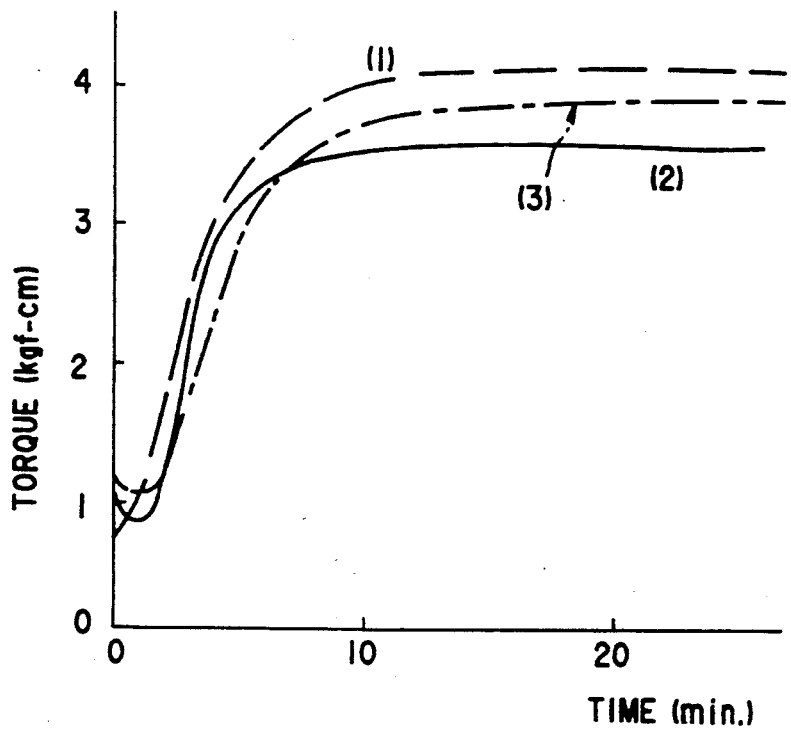
FIG. 2 is a graph of curves showing a relationship of viscosity of acrylic rubber compositions, expressed by a torque measured by an oscillating disc rheometer, with curing time as cured at a temperature of 170° C.

The curing characteristics of the acrylic rubber compositions were determined by using an oscillating disc rheometer (supplied by Toyo Seiki K.K.). The determination was carried out at temperatures of 110° C. and 170° C., and the results thereof are shown in FIG. 1 and FIG. 2, respectively. In FIG. 1 and FIG. 2, curves (1), (2) and (3) correspond to rubber formulations Run 1, Run 2 and Run 3, respectively, shown in Table 1.

TABLE 1

| | Curable Rubber Formulations | | |
| --- | --- | --- | --- |
| | Comparative Example | Examples of Invention | |
| Formulation Ingredients | Run 1 | Run 2 | Run 3 |
| Acrylic rubber *1 | 100 | 100 | 100 |
| MAF carbon | 60 | 60 | 60 |
| Stearic acid | 1 | 1 | 1 |
| Processing aid *2 | 1 | 1 | 1 |
| Age stabilizer *3 | 1 | 1 | 1 |
| Dibutylaminotriazine thio *4 | 1.5 | — | — |
| Polymer of dibutylamino-triazine thio *5 | — | 1.5 | 1.5 |
| HCA | — | 2.4 | — |
| Acetone addition product of HCA *6 | — | — | 3.0 |

*1 Active chlorine-containing acrylic rubber which is a copolymer of 30% by weight of ethyl acrylate, 40% by weight of butyl acrylate, 27% by weight of methoxyethyl acrylate and 3% by weight of an active chlorine-containing crosslinking monomer.
*2 "G8205" supplied by Dainippon Ink and Chem. Co.
*3 Amine age stabilizer "630F" supplied by Ohuchi Shinko K.K.
*4 6-dibutylamino-1,3,5-triazine-2,4-dithiol
*5 6-dibutylamino-1,3,5-triazine-2,4-dithiol polymer prepared in Referential Example 1
*6 Acetone addition product prepared in Referential Example 2

As seen from FIG. 1, rubber formulation Run 1 (Comparative Example) is slowly cured at 110° C., whereas rubber formulations Run 2 and Run 3 (Present Invention) are not cured at 110° C. In contrast, the three rubber formulations Run 1, Run 2 and Run 3 are cured at a high reaction rate at 170° C. which is an ordinary curing temperature. The rubber formulations of the invention (Run 2 and Run 3) are not cured at 110° C., and therefore, have excellent storage stability, and exhibit curing characteristics similar to those of the rubber formulation (Run 1) with the conventional dibutylaminotriazine thiol curing agent under ordinary curing conditions.

The rubber formulations Run 1, Run 2 and Run 3 shown in Table 1 were primarily press-cured at 170° C. for 20 minutes to prepare cured sheets having a thickness of 2 mm. The primarily cured sheets were secondarily cured at 170° C. for 4 hours. Tensile properties, hardness and compression set of the primarily cured sheets and the secondarily cured sheets in the original state were evaluated according to Japanese Industrial Standard (JIS) K6301. The compression set was measured after each sample sheet was maintained at 150° C. in the compressed state for 70 hours. The results are shown in Table 2.

TABLE 2

| | Properties of Cured Acrylic Rubber Sheets | | |
| --- | --- | --- | --- |
| | Comparative Example | Examples of Invention | |
| | Run 1 | Run 2 | Run 3 |
| Tensile Properties of Primarily Cured Products Cured at 170° C. for 20 minutes | | | |
| Tensile strength (kgf/cm$^2$) | 160 | 165 | 165 |
| Elongation (%) | 180 | 230 | 200 |
| Tensile stress at 100% elongation (kgf/cm$^2$) | 60 | 52 | 55 |
| Hardness (JIS A) | 67 | 68 | 67 |
| Tensile Properties of Primarily Cured Products Cured at 170° C. for 20 min. and then at 170° C. for 4 hours | | | |
| Tensile strength (kgf/cm$^2$) | 154 | 160 | 156 |
| Elongation (%) | 140 | 190 | 180 |
| Tensile stress at 100% elongation (kgf/cm$^2$) | 75 | 60 | 72 |
| Hardness (JIS A) | 70 | 70 | 69 |
| Compression Set | | | |
| Primarily cured at 170° C. for 20 minutes (%) | 36 | 34 | 33 |
| Secondarily cured at 170° C. for 4 hours (%) | 28 | 27 | 27 |

As seen from Table 2, the rubber formulations of the invention (Run 2 and Run 3) provide cured products having properties similar to those of the cured product of the conventional rubber formulation (Run 1).

The acrylic rubber composition of the invention has a good storage stability and is useful especially for articles such as seals and gaskets, for which good oil resistance and thermal resistance are required.

What is claimed is:

1. A curable acrylic rubber composition comprising:
   (A) an acrylic polymer which is a copolymer derived from (a) 60 to 99.9% by weight of an acrylic acid ester selected from the group consisting of alkyl acrylates having 1 to 8 carbon atoms in each alkyl group and alkoxyalkyl acrylates having 2 to 8 carbon atoms in each alkoxyalkyl group, (b) 0.1 to 10% by weight of an active group-containing unsaturated monomer, and (c) 0 to 30% by weight of a monoethylenically unsaturated monomer copolymerizable with the monomers (a) and (b);
   (B) 0.05 to 5 parts by weight, per 100 parts by weight of the acrylic polymer, of a polymer of a dibutylaminotriazine thiol, which is represented by the following formula (1):

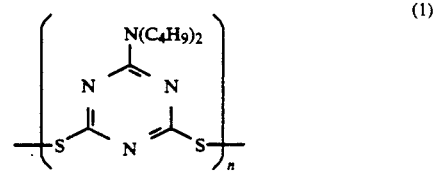

(1)

wherein n is an integer of 50 to 1,000, and
   (C) 0.6 to 3 moles, per mole of the dibutylaminotriazine thiol polymer (B), of 9,10-dihydro-9-oxa-10-phosphaphenanthrene-10-oxide represented by the following formula (2):

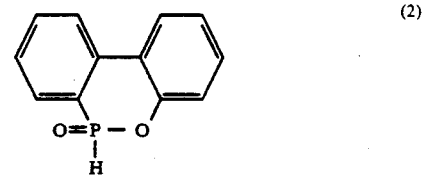

(2)

or a reaction product of 9,10-dihydro-9-oxa-10-phosphaphenanthrene-10-oxide with a carbonyl compound, represented by the following formula (3):

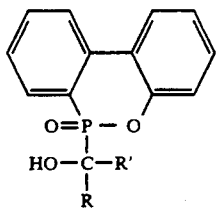
(3)

wherein R and $R^1$ independently represent a hydrogen atom or an organic atomic group selected from the group consisting of alkyl groups having 1 to 8 carbon atoms, alkenyl groups having 2 to 8 carbon atoms, a phenyl group, aralkyl groups having 7 to 12 carbon atoms, and cycloalkyl groups having 3 to 10 carbon atoms.

2. A curable acrylic rubber composition according to claim 1, wherein the acrylic acid ester (a) is selected from the group consisting of ethyl acrylate, butyl acrylate and methoxyethyl acrylate.

3. A curable acrylic rubber composition according to claim 1, wherein the active group-containing unsaturated monomer (b) is selected from the group consisting of 2-chloroethyl vinyl ether, vinyl chloroacetate, allyl chloroacetate, vinylbenzyl chloride, 2-chloroethyl vinyl ether, chloromethyl vinyl ketone, 5-chloromethyl-2-norbornene, glycidyl acrylate, glycidyl methacrylate, allyl glycidyl ether and vinyl glycidyl ether.

4. A curable acrylic rubber composition according to claim 1, wherein the acrylic polymer (A) is selected from the group consisting of an ethyl acrylate/vinyl chloroacetate copolymer, an ethyl acrylate/allyl glycidyl ether/acrylonitrile copolymer, an ethyl acrylate/butyl acrylate/glycidyl methacrylate copolymer and an ethyl acrylate/butyl acrylate/methoxyethyl acrylate/vinyl chloroacetate copolymer.

5. A curable acrylic rubber composition according to claim 1, wherein the carbonyl compound is selected from the group consisting of acetone, 2-pentanone, cyclopentanone, benzaldehyde and acetophenone.

6. A curable acrylic rubber composition according to claim 1, wherein the amount of the dibutylaminotriazine thiol polymer is 0.1 to 2 parts by weight per 100 parts by weight of the acrylic polymer.

7. A curable acrylic rubber composition according to claim 1, wherein the amount of each of 9,10-dihydro-9-oxa-10-phosphaphenanthrene-10-oxide of the formula (2) and the reaction product of the formula (3) is 0.9 to 2 moles per mole of the dibutylaminotriazine thiol polymer.

* * * * *